(12) United States Patent
Singh et al.

(10) Patent No.: US 12,518,859 B2
(45) Date of Patent: Jan. 6, 2026

(54) SYSTEMS AND METHODS FOR PROVIDING TEST RESULTS OF GENE SEQUENCING DATA ON A RECURRING BASIS

(71) Applicant: Helix, Inc., San Mateo, CA (US)

(72) Inventors: Enakshi Singh, Burlingame, CA (US); Sharoni Jacobs, Mill Valley, CA (US)

(73) Assignee: Helix, Inc., San Mateo, CA (US)

( * ) Notice: Subject to any disclaimer, the term of this patent is extended or adjusted under 35 U.S.C. 154(b) by 141 days.

(21) Appl. No.: 18/226,708

(22) Filed: Jul. 26, 2023

(65) Prior Publication Data

US 2025/0037822 A1    Jan. 30, 2025

(51) Int. Cl.
*G16H 15/00* (2018.01)
*G16B 20/20* (2019.01)

(52) U.S. Cl.
CPC ........... *G16H 15/00* (2018.01); *G16B 20/20* (2019.02)

(58) Field of Classification Search
CPC ................................ G16H 15/00; G16B 20/20
See application file for complete search history.

(56) References Cited

U.S. PATENT DOCUMENTS

| | | | | |
|---|---|---|---|---|
| 7,529,685 B2 * | 5/2009 | Davies | ................... | G16Z 99/00 707/999.005 |
| 8,119,348 B2 * | 2/2012 | Swaroop | .............. | C12Q 1/6883 536/23.1 |
| 8,688,388 B2 * | 4/2014 | Dzakula | ................ | G16B 40/00 700/1 |
| 9,068,229 B2 * | 6/2015 | Cox | ........................ | A61P 35/00 |
| 9,133,519 B2 * | 9/2015 | Neibergs | .............. | C12Q 1/6883 |
| 9,424,392 B2 * | 8/2016 | Rabinowitz | ........... | G16B 40/00 |
| 9,430,611 B2 * | 8/2016 | Rabinowitz | ........... | G16B 25/00 |
| 9,518,298 B2 * | 12/2016 | Chan | .................... | C12Q 1/6883 |
| 9,639,542 B2 * | 5/2017 | Kumar | .................. | G06F 16/164 |
| 9,702,011 B2 * | 7/2017 | Cox | ..................... | C12Q 1/6886 |
| 9,732,390 B2 * | 8/2017 | Lo | ........................... | G16B 30/10 |
| 9,916,313 B2 * | 3/2018 | Kumar | .................. | G16B 50/00 |
| 10,108,777 B2 * | 10/2018 | Huang | ................. | C12Q 1/6827 |
| 10,227,652 B2 * | 3/2019 | Rabinowitz | ........... | G16B 40/00 |
| 10,229,244 B2 * | 3/2019 | Ghosh | .................. | G16B 40/30 |
| 10,233,489 B2 * | 3/2019 | Nygren | ................ | C12Q 1/6827 |
| 10,240,202 B2 * | 3/2019 | Rabinowitz | ........... | G16B 20/40 |

(Continued)

OTHER PUBLICATIONS

Hambuch, 2015, Elsevier, pp. 21-34.*

(Continued)

*Primary Examiner* — Michael I Ezewoko
(74) *Attorney, Agent, or Firm* — FisherBroyles, LLP; Gregory T. Fettig

(57) ABSTRACT

Systems and methods herein provide for rapid patient information to healthcare providers such that the healthcare providers can make more informed diagnoses. One method includes storing gene sequencing data and called genetic variants of a patient in a data structure. The method also includes receiving a request from a healthcare provider for results of a test that reports at least a portion of the called genetic variants in relation to a diagnosis of the patient by the healthcare provider, and delivering the results of the test to the healthcare provider if a quality control value of said at least a portion of the called genetic variants meets or exceeds a predetermined threshold of quality for assisting the healthcare provider.

18 Claims, 7 Drawing Sheets

(56) References Cited

U.S. PATENT DOCUMENTS

| | | | | |
|---|---|---|---|---|
| 10,392,664 | B2* | 8/2019 | Rabinowitz | C12Q 1/6876 |
| 10,392,666 | B2* | 8/2019 | Lo | G16B 30/00 |
| 10,395,772 | B1* | 8/2019 | Lucas | G16H 10/60 |
| 10,407,738 | B2* | 9/2019 | Cox | C12Q 1/6886 |
| 10,513,728 | B2* | 12/2019 | Nygren | C12Q 1/6827 |
| 10,597,724 | B2* | 3/2020 | Rabinowitz | G16B 25/00 |
| 10,604,791 | B2* | 3/2020 | Honisch | C12Q 1/6809 |
| 10,640,817 | B2* | 5/2020 | Nygren | C12Q 1/6827 |
| 10,706,957 | B2* | 7/2020 | Lo | G16B 20/10 |
| 10,711,309 | B2* | 7/2020 | Rabinowitz | G16B 30/00 |
| 10,865,439 | B2* | 12/2020 | Nygren | C12Q 1/6827 |
| 11,001,884 | B2* | 5/2021 | Van Den Boom | G16B 20/20 |
| 11,111,543 | B2* | 9/2021 | Rabinowitz | G16B 25/00 |
| 11,111,544 | B2* | 9/2021 | Rabinowitz | C12Q 1/6876 |
| 11,274,347 | B2* | 3/2022 | Lo | G16B 30/10 |
| 11,306,359 | B2* | 4/2022 | Rabinowitz | G16B 25/00 |
| 11,321,327 | B2* | 5/2022 | Stennett | G06F 16/24568 |
| 11,436,429 | B2* | 9/2022 | Jaganathan | G06V 10/751 |
| 11,640,859 | B2* | 5/2023 | Colley | G16H 20/00 702/19 |
| 11,657,900 | B2* | 5/2023 | Ghosh | G16B 40/00 703/2 |
| 11,667,958 | B2* | 6/2023 | Honisch | C12Q 1/6858 435/6.12 |
| 11,676,685 | B2* | 6/2023 | Jaganathan | G06V 10/764 706/25 |
| 11,680,289 | B2* | 6/2023 | Nygren | C12Q 1/6827 435/6.12 |
| 11,705,226 | B2* | 7/2023 | Colley | G16B 40/00 705/3 |
| 11,810,331 | B2* | 11/2023 | Jiang | G06N 3/047 |
| 11,915,822 | B2* | 2/2024 | Yi | G16H 50/20 |
| 12,018,314 | B2* | 6/2024 | Selvaraj | G16B 40/00 |
| 12,065,703 | B2* | 8/2024 | Rabinowitz | C12Q 1/6886 |
| 12,112,839 | B2* | 10/2024 | Colley | G16H 20/10 |
| 12,119,088 | B2* | 10/2024 | Jaganathan | G06V 10/763 |
| 12,119,117 | B2* | 10/2024 | Wang | G06V 10/42 |
| 12,188,083 | B2* | 1/2025 | Mosko | C12Q 1/6813 |
| 2003/0046114 | A1* | 3/2003 | Davies | G16Z 99/00 705/3 |
| 2007/0143149 | A1* | 6/2007 | Buttner | G16H 10/60 705/3 |
| 2010/0029498 | A1* | 2/2010 | Gnirke | C12Q 1/6811 506/9 |
| 2011/0160092 | A1* | 6/2011 | Webster | G16B 25/00 506/24 |
| 2012/0004893 | A1* | 1/2012 | Vaidyanathan | G16H 50/50 703/11 |
| 2014/0365242 | A1* | 12/2014 | Neff | G16H 10/60 707/756 |
| 2015/0119264 | A1* | 4/2015 | Williams | C12Q 1/6883 506/17 |
| 2015/0234842 | A1* | 8/2015 | Kumar | G16B 50/00 707/741 |
| 2015/0234870 | A1* | 8/2015 | Kumar | G16B 50/00 707/807 |
| 2015/0324527 | A1* | 11/2015 | Siegel | G16B 50/30 705/3 |
| 2016/0085910 | A1* | 3/2016 | Bruand | G16B 20/00 702/19 |
| 2017/0283854 | A1* | 10/2017 | Dervinis | G16B 20/20 |
| 2018/0187241 | A1* | 7/2018 | Selvaraj | C12Q 1/6883 |
| 2018/0298433 | A1* | 10/2018 | Nygren | C12Q 1/6853 |
| 2019/0287650 | A1* | 9/2019 | Ghosh | G16B 40/30 |
| 2019/0367970 | A1* | 12/2019 | Mosko | C12Q 1/6813 |
| 2020/0004751 | A1* | 1/2020 | Stennett | G06F 16/24568 |
| 2020/0040402 | A1* | 2/2020 | Cox | A61P 35/00 |
| 2020/0239958 | A1* | 7/2020 | Hageman | A61P 27/02 |
| 2020/0327377 | A1* | 10/2020 | Jaganathan | G06V 10/993 |
| 2020/0388349 | A1* | 12/2020 | Lo | C12Q 1/6869 |
| 2021/0062254 | A1* | 3/2021 | Nygren | C12Q 1/6827 |
| 2021/0108266 | A1* | 4/2021 | Luo | G16B 20/20 |
| 2021/0151126 | A1* | 5/2021 | Robertson | C12Q 1/6869 |
| 2022/0101948 | A1* | 3/2022 | Cooper | C12N 9/485 |
| 2022/0154259 | A1* | 5/2022 | Zembutsu | C12Q 1/6886 |
| 2022/0267861 | A1* | 8/2022 | Lo | C12Q 1/6886 |
| 2022/0288004 | A1* | 9/2022 | Laurila | C12N 9/1205 |
| 2023/0004749 | A1* | 1/2023 | Jaganathan | G06V 10/764 |
| 2023/0063495 | A1* | 3/2023 | Mizrahi | A61K 35/74 |
| 2023/0313288 | A1* | 10/2023 | Artieri | C12Q 1/6869 435/6.11 |
| 2024/0229161 | A9* | 7/2024 | Gonzalez | C12Q 1/6883 |
| 2024/0352506 | A1* | 10/2024 | Selvaraj | G16B 20/00 |
| 2024/0392376 | A1* | 11/2024 | Rabinowitz | C12Q 1/686 |

OTHER PUBLICATIONS

Gallagher (2018) "New Mayo Clinic GeneGuide DNA testing application provides genetic testing, insights backed by Mayo Clinic expertise" https://newsnetwork.mayoclinic.org/discussion/new-may-clinic-gene-guide-dna-testing-application-provides-genetic-testing-insights-backed-by-mayo-clinic-expertise/.

GATK (accessed online Aug. 1, 2023) "A genomic analysis toolkit focused on variant discovery" https://gark.broadinstitute.org/hc/en-us#info-tab.

Li and Durbin (2009) "Fast and accurate short read alignment with Burrows-Wheeler Transform" Bioinformatics 25:1754-60 [PMID: 19451168].

* cited by examiner

SYSTEMS AND METHODS FOR PROVIDING TEST RESULTS OF GENE SEQUENCING DATA ON A RECURRING BASIS

FIELD

The disclosure relates to the field of genomic analysis, and in particular, to providing genetic variant test results on a recurring basis.

BACKGROUND

Patients routinely undergo genetic testing to better understand the implications of certain genetic variants that may impact their health. For example, when a patient is presented with a set of symptoms, those symptoms could be indicative of a genetic condition. A such, a healthcare provider may order a genetic test for that specific genetic condition. Genetic material is then acquired from a biological sample of the patient and shipped to a laboratory for testing in an environmentally controlled process. The laboratory may require days or even weeks to run the test before providing results. This process is typically ad hoc, expensive, and time-consuming.

SUMMARY

Embodiments described herein beneficially assist healthcare providers by providing rapid and valuable patient information to the healthcare providers such that the healthcare providers can make more informed diagnoses. For example, the embodiments herein may provide gene sequencing for a large swathe of genetic data for a single patient, and then provide for the reuse of that information multiple times to determine various genetic conditions for the patient. This process lessens the need for re-testing, and reduces the chance of samples becoming contaminated, misplaced, and/or or mistaken.

In some embodiments, delivery of diagnostic test results is managed and controlled based on Quality Control (QC) guidelines for each of a plurality of analytical tools. Many analytical tools may be used for diagnostic tests to provide a numerical quality metric and a diagnostic result (e.g., tools such that utilize machine learning, including neural networks and regression models).

In some embodiments, a minimum numerical quality metric for each of multiple diagnostic tests is centrally assigned, which may vary across tests. And, by controlling the acceptable quality on a test-by-test basis, results reported by an analytical model may be accepted for certain diagnostic tests.

In one embodiment, a method includes obtaining or having obtained a biological sample from a patient, performing, or having performed sequencing on the biological sample to generate gene sequencing data of the patient, and calling genetic variants in portions of the gene sequencing data. The method also includes storing the gene sequencing data and the called genetic variants in a data structure. For example, the method may include performing a plurality of tests on the gene sequencing data, and for each of the plurality of tests, configuring the data structure to store a test name of the test, a tool name used to perform the test, a corresponding portion of the called genetic variants, and a quality control value of the test. The method also includes receiving a request from a healthcare provider for results of a test that reports at least a portion of the called genetic variants in relation to a diagnosis of the patient by the healthcare provider, and delivering the results of the test to the healthcare provider if a quality control value of said at least a portion of the called genetic variants meets or exceeds a predetermined threshold of quality for assisting the healthcare provider. The quality control value may be at least one of: a callability of at least ninety-nine percent across genetic loci considered by the test; at most 0.01 for a gene dispersion of the gene sequencing data associated with the called genetic variant; at most five percent for a ratio of bacterial DNA to human DNA of the gene sequencing data associated with the called genetic variant; at least twenty for fold enrichment of the gene sequencing data associated with the called genetic variant.

Thereafter, the method may also include receiving another request for results of another test that reports another portion of the called genetic variants, delivering the results of the other test if a quality control value of the other portion of the called genetic variants meets or exceeds a predetermined threshold for assisting the healthcare provider.

In another embodiment, the method includes preserving the biological sample in a laboratory, and retesting the biological sample when the quality control value of said at least a portion of the called genetic variants does not meet the predetermined threshold. Retesting generally includes resequencing a portion of the biological sample at locations of said at least a portion of the called genetic variants in the gene sequencing data.

The method may also include assigning an identifier to the gene sequencing data that identifies the patient, labeling the data structure with the assigned identifier. The method may also include determining quality control values for the called genetic variants. The method may also include analyzing ancestry of the patient based on the gene sequencing data.

Other illustrative embodiments (e.g., systems and computer-readable media relating to the foregoing embodiments) may be described below. The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description depict specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
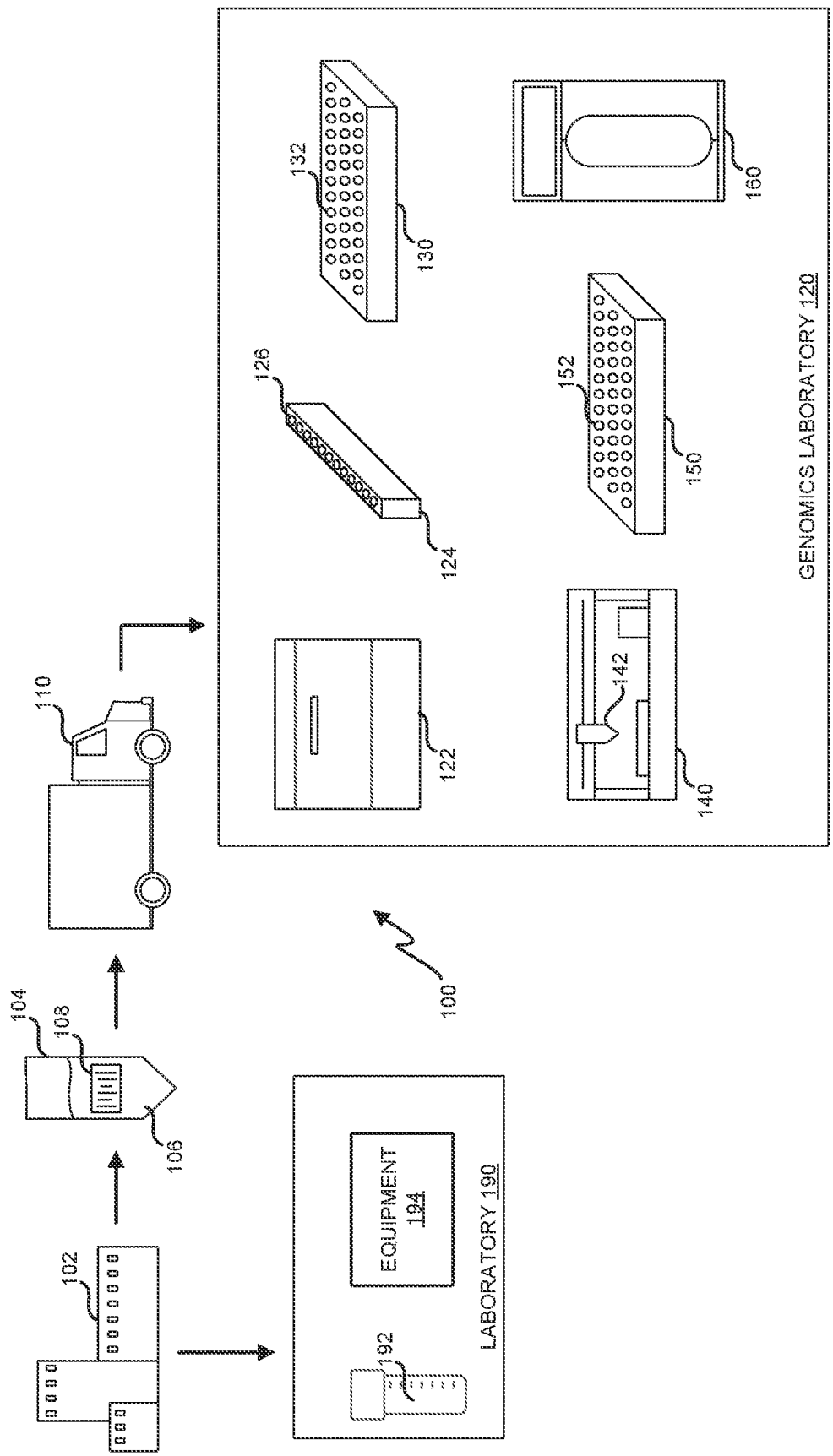
FIG. 1 is a diagram depicting a sample processing architecture in an illustrative embodiment.

FIG. 1 is a diagram depicting a sample processing architecture 100 in an illustrative embodiment. Sample processing architecture 100 comprises any system or organizational structure for acquiring and sequencing biological samples in a high-volume, high-throughput manner. Sample processing architecture 100 may be utilized, for example, to collect and sequence genetic material (in the form of Ribonucleic Acid (RNA) or Deoxyribonucleic Acid (DNA)) found within thousands or tens of thousands of samples 106 daily, via multiple healthcare provider networks 102.

Healthcare provider networks 102 may comprise hospitals, clinics, practitioner offices, laboratories, surgical centers, etc. that engage in or facilitate the practice of medicine. In one embodiment, healthcare provider networks 102 each comprise groups of hospitals that treat millions of patients. As a part of the practice of medicine, healthcare provider networks 102 acquire samples 106 for sequencing. For example, a healthcare provider network 102 may acquire samples 106 as part of a population screening program, as part of medical treatment, etc. The specific amount of sequencing desired for a sample 106 may comprise a selected set of one or more genes, an exome, the entire genome of a patient, etc. The samples 106 are stored in sample containers 104, which may be accompanied by Customer Sample Identifiers (CSIs) 108. A delivery service 110 provides the samples 106 to a genomics laboratory 120 for processing.

Healthcare provider networks 102 may also acquire samples 192 for blood testing. These samples 192 may be provided to laboratory 190 for analysis via equipment 194 (e.g., a chemically treated test strip, biochemical assay, etc.), or may be analyzed by patients via at-home testing methods. Sample processing architecture 100 provides a technical benefit by allowing laboratory 190 and genomics laboratory 120 to specialize in different methods of analysis.

Procedures within genomics laboratory 120 related to genetics may include accessioning, sample plating, storage, extraction, library preparation, enrichment, and sequencing processes. These processes acquire genetic material from a sample 106, separate the genetic material from other constituents, duplicate the genetic material, and quantify the genetic material order to determine a swathe of sequence data, such as an exome or entire genome for a subject (e.g., a human patient, an organelle of a human patient, etc.). Although the procedures discussed herein are specific with regard to one method of sequencing, other techniques may be utilized in accordance with known standards in order to perform sequencing for samples 106. For example, although the techniques discussed herein relate to hybridization capture techniques, amplicon-based techniques may be used.

Accessioning

Accessioning refers to receiving and preparing samples 106 for later laboratory processes. In one embodiment, accessioning includes receiving a batch of samples 106 (e.g., hundreds or thousands of samples 106) from one or more delivery services 110 each day for processing. For example, packages that each include tens or hundreds of samples 106 may be delivered to genomics laboratory 120 via the United States Postal Service (USPS), or a private package carrier.

Each sample 106 may be retained within a sample container 104, such as a five milliliter (mL) test tube. In this embodiment, the sample container 104 is sealed to prevent the sample 106 from being exposed to the environment and also to prevent the sample 106 from co-mingling with other samples 106. For example, the sample 106 may be sealed via a cap that is threaded, glued, press-fit, etc. At the time of delivery, the sample container 104 may further include a remnant of a sampling tool, such as a portion of a swab that was utilized to acquire the sample.

In many embodiments, a CSI 108 for the sample 106 is reported via a component affixed to or integrated with the sample container 104. The CSI 108 uniquely distinguishes the sample 106 from other samples 106 being received. For example, a CSI 108 may uniquely distinguish a sample 106 from other samples 106 in the same batch, other samples 106 received on the same date, other samples 106 received from the same healthcare provider network 102, etc. A CSI 108 may be reported via a barcode label, Quick Response (QR) code label, Radio Frequency Identifier (RFID) chip, or any suitable visual, transmission-generating, or other physical component affixed to or integrated with the sample container 104.

In further embodiments, the sample container 104 is itself sealed within an external container such as a bag (not shown). Using an external container helps to prevent contamination, by ensuring that a technician at the genomics laboratory 120 does not contact biological material from the sample 106 that may exist on an outer surface of the sample container 104. Use of an external container may also be required by law (e.g., Department of Transportation (DOT) guidelines). Use of an external container additionally helps to prevent cross-contamination between samples 106. Furthermore, in embodiments where samples 106 may include blood or a pathogen, an external container provides an additional barrier to protect the health of technicians. The external container may additionally include documentation confirming the CSI 108, information for the subject that the sample was sourced from, and/or information indicating circumstances of sampling. The circumstances of sampling may include, for example, a sampling date, a sampling method, a location that the sample was acquired, a name or title for a person who performed the sampling, and/or additional notes.

In this embodiment, the sample 106 comprises a chemical solution. For example, the sample 106 may comprise a prepared aqueous solution such as a saline solution, or may comprise a bodily fluid such as blood, saliva, mucus, etc. In some embodiments each of the samples 106 fills between two and five milliliters of volume within its corresponding sample container 104.

The samples 106 further include genetic material such as Deoxyribonucleic Acid (DNA), Ribonucleic Acid (RNA), etc. In many instances, the genetic material is one of many constituent components within the sample 106. For example, the genetic material may exist within the nuclei of white blood cells that are included within the sample 106. In a further example, genetic material may exist within viruses or bacteria within the sample 106. In this embodiment, the genetic material is not yet isolated from the remaining constituent components of the sample 106.

After receipt of the samples 106, batches of the samples 106 (e.g., as stored within sample containers 104 and/or external containers) may be heated in ovens 122 to facilitate cell lysis. The temperature, and duration of heating, may be chosen such that pathogenic material within the samples 106 is rendered harmless, or such that cellular lysis occurs. For example, heating may occur at a temperature of between forty and eighty (e.g., fifty) degrees Celsius (C.), for a period of time between fifteen and two hundred (e.g., thirty) minutes. In some embodiments, including embodiments wherein the samples 106 are primarily the contents of a blood draw, the heating step may be foregone.

Upon completion of heating, the batches of samples 106 are removed from the ovens 122. In one embodiment, sample containers 104 are removed from corresponding external containers, such as by cutting the external containers open. With the sample containers 104 now available for direct interaction, the sample containers 104 are inspected. As a part of this process, a technician or automated system may determine the CSI 108 for the sample 106, and may compare the CSI 108 to a CSI 108 listed on documentation provided in the external container. If there is a discrepancy between the CSI 108 on the sample container 104 and a CSI 108 listed in the documentation, the sample 106 may be flagged as having an error condition. Similarly, if the CSI 108 on the sample container 104 is damaged (e.g., abraded, heat-damaged, or water-damaged) and has become unreadable, the sample 106 may be flagged as having an error condition.

A technician or automated system may further inspect the contents of the sample container 104, via visual or other methods. If the sample 106 does not include an expected constituent component (or is otherwise non-compliant) then the sample 106 is flagged as having an error condition. For example, if the sample 106 is primarily saliva and includes a fluid that is not permitted (e.g., blood), includes an entire swab or no swab, appears to have a fractured or broken casing, or is outside of an expected range of volume (e.g., between two and five milliliters), then the sample 106 may be flagged as having an error condition.

Samples 106 that have not been flagged as having an error condition proceed to sample integration. In one embodiment, as a part of sample integration, the sample 106 is assigned a Laboratory Sample Identifier (LSI). The LSI uniquely identifies the sample 106 from other samples 106 received for the batch, received on the same day, processed in the same laboratory, and/or handled by the same organization performing sequencing. In many embodiments, the LSI is stored in a memory of a genomics server (e.g., within a laboratory sample database), and is uniquely associated with a corresponding CSI 108 for the sample. The LSI may also be associated with any error conditions reported for the sample 106.

In many embodiments, CSIs 108 originally provided with the samples 106 are in the form of a paper barcode. In such embodiments, the paper barcode may be printed in aqueous ink. This renders the barcode subject to degradation upon exposure to liquid in the laboratory environment, which is undesirable.

To ensure that each sample container 104 is capable of traveling through the genomics laboratory 120 without its identifier being physically degraded, a corresponding LSI may be indicated at the sample container 104. The LSI may be indicated via the application of a barcode label, Quick Response (QR) code, Radio Frequency Identifier (RFID) chip, or other visual, transmission-generating, or other physical component affixed to or integrated with the sample container.

In one embodiment, the LSI is printed onto a barcode label comprising rip-proof material (e.g., vinyl) in a water-insoluble ink. This implementation ensures that the barcode label is resistant to physical and chemical degradation. The barcode may be applied around an entire perimeter of the sample container 104, ensuring that the sample container 104 may be scanned from any angle.

In further embodiments, the element used to report the LSI is accompanied by a visually distinct mark that enables rapid confirmation by a technician that the sample 106 has been integrated into the laboratory environment. The visually distinct mark may comprise a colored ring (e.g., around an entire perimeter of the sample container), a logo, a physical feature, a stamp, etc.

Sample Plating

With the samples 106 having been successfully integrated into the environment of the genomics laboratory 120 environment, the samples 106 are ready for analytics to be performed. To this end, the samples 106 are prepared for transfer to a sample microplate 130. The sample microplate 130 may be labeled with a unique identifier via similar techniques to those used for sample containers 104 above. The unique identifier distinguishes the sample microplate 130 from other sample microplates 130. In one embodiment, the sample microplate 130 comprises a solid body defining three hundred and eighty-four wells, distributed across sixteen rows and twenty-four columns, each well having a capacity of between thirty and one hundred microliters. In a further embodiment, the sample microplate 130 comprises a solid body defining ninety-six wells, distributed across eight rows and twelve columns, each well having a capacity of between one hundred and three hundred microliters. Any suitable number and arrangement of wells may be selected as a matter of design choice.

As a part of preparing the samples 106 for transfer to the sample microplate 130, a technician may place sample containers 104 onto a rack 124, and scan each sample container 104 to determine an LSI for each location 126 (e.g., each container receptacle) on the rack 124. In some embodiments, the rack 124 is assigned a unique identifier that distinguishes it from other racks 124. The rack 124 may be labeled with a unique identifier using techniques similar to those used for sample containers 104. The technician, or automated machinery such as a server operating an optical scanner, may then associate the unique identifier for the rack 124, along with the locations 126 assigned to the samples 106, with the corresponding LSIs of the samples 106 stored at the rack 124.

The technician additionally unseals the sample containers 104. Unsealing of sample containers 104 may be a deeply labor-intensive process, particularly when laboratory processes are performed at scale to handle tens of thousands of samples 106 per day. Thus, a technician may utilize automated tooling to enhance the speed at which sample containers 104 are unsealed. The tooling may, for example, unscrew, cut, or drill each sample container 104, in order to make the sample 106 within available for physical transfer to the sample microplate 130.

One or more racks 124 of samples 106 are provided to a Liquid Handler (LH) 140, such as an automated robot that operates an end effector 142 in accordance with one or more Numerical Control (NC) programs to transfer liquids between wells via arrays of micropipettes. An LH 140 is also known as a "Liquid Handling System." LH 140 may comprise, for example, a Hamilton Microlab Star Liquid Handling System.

In this embodiment, the LH 140 proceeds to transfer a portion of each sample 106 at a rack 124 to a well 132 within the sample microplate 130 that is not shared with other samples 106. For example, the well 132 for each sample 106 may be predetermined in accordance with a control program used by the genomics laboratory 120. In one embodiment, the LH 140 transfers the portions of the samples 106 to the wells 132 of the sample microplate 130 by providing instructions to actuators, piezoelectric elements, and/or pressure systems operating the end effector 142. In such an embodiment, the end effector 142 may align its array of micropipettes with the sample containers 104 to retrieve portions of the samples 106. Furthermore, in such an embodiment, the end effector 142 may dynamically align its array of micropipettes with the sample microplate 130 to deposit the portions of the samples 106 at the wells 132.

Because there is a known relationship between locations 126 at the rack 124 and wells 132 of the sample microplate 130 (e.g., as indicated by row and column), contents of the memory of a genomics server (e.g., a laboratory sample database) may be updated to indicate the well 132 storing genetic material for each sample 106. In one embodiment, the memory is further updated to associate a unique identifier for the sample microplate 130 with the samples 106 stored therein.

In one embodiment, programmed instructions for the LH 140 may direct the end effector 142 to position itself above a set of disposable tips, descend into the tips to attach the tips, reposition the end effector 142 above the rack of sample containers 104, adjust spacing between micropipettes within the array, descend until the tips reach the sample containers 104, draw liquid from the sample containers 104, deposit the liquid into a well at the sample microplate 130, and then dispose of the tips. Such a process may be repeated across sample containers 104 stored on multiple racks until the sample microplate 130 is filled with portions from the samples 106. In one embodiment, one or more wells 132 on the sample microplate 130 are filled with a control reagent instead of a portion of a sample 106.

The amount of liquid drawn from each sample container 104 may comprise a small fraction of the overall volume of the sample container 104. For example, an amount of liquid drawn may comprise several microliters, such as between two and ten microliters. Upon completion of transfer from the sample containers 104 to the wells, the sample microplate 130 may be covered with a liquid and/or gas-impermeable layer, such as foil or paraffin. Sample containers 104 remaining on the racks may be resealed, for example with pressure-fit caps having a color distinct from an original color for the sample containers. With accessioning now complete for the sample microplate 130, the sample microplate 130 is transferred to a next section of the laboratory for processing.

Storage

In one embodiment, accessioned samples 106, samples 106 ready for analytics, and/or samples 106 that have already been sequenced, are stored for later use. For example, samples 106, sample containers 104, and/or sample microplates 130 may be stored at room temperature, or may be cryogenically frozen at a low temperature (e.g., negative eighty degrees Celsius) and arranged in racks for later retrieval. Samples 106 may be preserved for periods of days or years, enabling rapid re-testing to be performed for subjects without the need for re-acquiring genetic material. Storage of the samples 106 provides notable value in the event that contents of a well 132 used for sequencing do not meet with rigorous quality control standards. Specifically, storage enables re-sampling to occur in the event that there is a desire to resequence a sample 106.

Extraction

Sample microplates 130 are transferred to a portion of the genomics laboratory 120 dedicated to extraction of the genetic material. The segment of the laboratory 120 that performs extraction and other pre-amplification operations may be sealed from, and/or positively pressurized relative to, other portions of the genomics laboratory 120.

During extraction, a sample microplate 130 is acquired and provided to an LH 140. The LH 140 that performs extraction may be different from the LH 140 that performs sample plating. The LH 140 may apply a reagent to each well 132 that lyses cells within each well. For example, this may be performed in order to lyse white blood cells containing genetic material for a human, or may comprise lysing other types of cells to expose other types of genetic material. The reagents used for pre-amplification processes may be stored at the LH 140 in a temperature-controlled manner, and may even be vibrated or mixed on a regular basis to ensure that the reagents are evenly distributed in suspension.

In one embodiment, extraction further includes an LH 140 aspirating and dispensing reagents that selectively bind to genetic material released from the lysed cells. This process may include applying a bead (not shown) to the well 132. In one embodiment, the beads comprise magnetic beads that selectively bind to the genetic material (e.g., DNA). This allows for isolation and purification of the genetic material while contaminants remain in solution. In one embodiment, the magnetic bead is drawn to a magnetic base at or under the sample microplate 130. After the genetic material has been drawn to the bead, and after the bead has been secured to the base of the well, a flushing step may be performed wherein remaining fluid in each well is washed away. This ensures that potential impurities are removed from the well. The LH 140 may further add or remove fluid from each well 132 to perform additional concentration and/or elution of the genetic material, and may transfer fluid from the wells 132 of the sample microplate 130 to wells 152 of a genome stock microplate 150. The genome stock microplate 150 may be labeled with a unique identifier, and the contents of each well 152 of the genome stock microplate 150 may be associated with a corresponding LSI. In all phases of operation, the LH 140 is operated to ensure that fluid is not transferred between wells 152, as this results in contamination.

In one embodiment, a portion of fluid is removed from each well 152 of the genome stock microplate 150 for quality control purposes. Concentration of genetic material within the wells 152 may be confirmed via testing of this fluid, such as by application of a dye that reacts with the genetic material at known levels of fluorescence for known concentrations.

Library Preparation

After extraction is completed, library preparation may be performed for the contents of the genome stock microplate 150. The bead for each well, including ionically bonded genetic material, is transferred to a distinct well of a library preparation microplate (not shown). The library preparation microplate includes an identifier that uniquely distinguishes it from other library preparation microplates, and the LSI associated with each well on the genome stock microplate 150 may be mapped to a corresponding well on the library preparation microplate.

The library preparation microplate may be transferred to a new portion of the genomics laboratory 120 that is sealed from, and/or positively pressurized relative to, other portions of the genomics laboratory 120 that do not perform amplification of genetic material. This feature helps to prevent amplified genetic material from entering portions of the laboratory where genetic material has not been amplified, which could result in contamination. The transfer process may be performed by placing a library preparation microplate into an airlock at the pre-amplification portion of the genomics laboratory 120, scaling the airlock, and then retrieving the library preparation microplate from the airlock via the amplification portion of the genomics laboratory 120.

In one embodiment, a reagent is applied to each well of the library preparation microplate. The reagent ionically bonds to the surface of the bead within the well, and does so more strongly than the genetic material. This releases the genetic material from the surface of the bead of each well, enabling the genetic material to be chemically interacted with.

Library preparation may include normalization of a concentration of genetic material in each well of the library preparation microplate. Library preparation further includes fragmentation of the genetic material via an enzyme or via the application of physical forces. During this process, the entire genome (e.g., roughly three billion base pairs for a human genome), may be fragmented into pieces. In one embodiment, the pieces vary between three hundred and four hundred base pairs in length. These pieces are known as nucleic acid fragments.

In this embodiment, the nucleic acid fragments undergo adaptor ligation and indexing in accordance with known techniques. For example, this may comprise Next Generation Sequencing (NGS) library preparation processes defined by Illumina. Next, a limited amount of Polymerase Chain Reaction (PCR) amplification is performed upon the library. The resulting solution is then purified and eluted via operation of an LH 140.

During library preparation, one or more reference samples of genetic material, distinct from the genetic material found in the samples, may be added to wells of the library preparation microplate. The reference samples do not include genetic material received from a customer, but rather include known sequences of base pairs. The reference samples serve as controls to ensure that processes are carried out with sufficient quality.

Upon completion of library preparation, desired fragments of the genetic material (e.g., thousands or millions of distinct fragments of the genetic material, each corresponding with a different portion of a genome of the subject) have been ligated to predefined adapters (e.g., DNA adapters) that bind with the genetic material. Each of the adaptor-ligated fragments is referred to as a "library."

In further embodiments, the probes applied to each well of the library preparation plate include chemical identifiers (colloquially referred to as "barcodes") that are distinct from each other. The use of a different chemical identifier for probes applied to each well of the library preparation microplate enables sequencing to later be performed for multiple subjects on the same flow cell, without conflating sequencing results for those subjects.

The library preparation process may further comprise controlling a concentration of the genetic material in each well, and purification and/or elution of the resulting material. Similar to the processes performed after extraction of genetic material, concentration of genetic material after library preparation may be confirmed for each well via testing.

Enrichment

After library preparation, enrichment processes may be performed in order to either directly amplify (e.g., via amplicon or multiplexed PCR) or capture (e.g., via hybrid capture) predefined libraries. This enhances the ease of sequencing desired portions of the genome.

In one embodiment, during enrichment, customized biotinylated oligonucleotide probes are applied to the libraries. The probes selectively hybridize genetic material occupying desired portions of the genome for the genetic material, such as specific genes, or the entire exome. Magnetic beads bind to biotin molecules in the probes to attach the hybridized material to the magnetic beads. Magnetic forces capture the beads in place, enabling remaining fluid within each well to be removed or washed out, thereby removing impurities, and leaving only the genetic material that is desired. Genetic material may be released from the beads in a similar manner to that discussed above for prior processes.

In a further embodiment, hybrid capture target enrichment is performed. During this process, the probes comprise tailored oligonucleotides that are chosen to bind to the genetic material. The range of probes may be tailored as a group to bind to specific alleles, specific genes, the exome, the entire genome, etc. That is, each probe may bind to a nucleic acid fragment at a specific location on the genome, and the range of probes may be selected to ensure that alleles, genes, the exome, or the entire genome of the subject being considered is acquired. Utilizing probes in this manner may enhance efficiency of the sequencing process, by foregoing the need to sequence all of the roughly three billion base pairs found in the human genome.

The enrichment process may further comprise controlling a concentration of the genetic material in each well, and purification and/or elution of the resulting material. Similar to the processes performed after extraction of genetic material, concentration of genetic material after enrichment may be confirmed for each well via testing.

Sequencing

Sequencing may be performed according to any of a variety of techniques, including short-read and long-read techniques, via sequencing equipment 160 (e.g., an Illumina NovaSeq X sequencing machine). In one embodiment, the sequencing is performed as Sequencing by Synthesis (SBS). For example, sets of enriched libraries of genetic material bound to probes in earlier steps may be transferred to a flow cell, and annealed to oligonucleotide probes within the flow cell. At this stage, the contents of multiple wells may be applied to the same flow cell, because the libraries within those wells are tagged with the chemical identifiers referred to above. In one embodiment, the chemical identifiers comprise nucleotide sequences that are detectable during the sequencing process to determine a corresponding LSI.

Complementary sequences may then be created via enzymatic extension to create a double-stranded portion of genetic material. The double-stranded genetic material may then be denatured, and the library fragment may be washed away. Bridge amplification may then be performed to create copies of the remaining molecule in a localized cluster. For example, a cluster may comprise twenty to fifty copies of the same molecule, localized to a location the size smaller than a pinhead on the flow cell.

In this embodiment, sequencing primers are annealed to library adapters in order to prepare the flow cell for SBS.

During SBS, the sequencing primer uses reverse terminator fluorescent oligonucleotides, one base per cycle, for a number of cycles (e.g., one hundred and fifty cycles) in the forward direction. After the addition of each nucleotide, clusters are excited by a light source, resulting in fluorescence which can be measured. The emission wavelength and signal intensity for each cluster determines a base call for that cluster. Fluorescent moieties are then flushed from the flow cell. A chemical group blocking a 3' end of the fragment is then removed, enabling a subsequent nucleotide to be read. This tightly controls nucleotide addition and detection.

Additionally in this embodiment, base calls across cycles at the same physical location on the flow cell occur at the same cluster, and hence indicate sequential reads for copies of the same fragment of the genetic material. After each cycle, denaturing and annealing are performed to extend the index primer. A complementary reverse strand is created and extended via bridge amplification. The reverse strand is then read in the reverse direction for a number of cycles, in a manner similar to reads in the forward direction.

Depending on whether a complete human genome, or another set of genomic data, is being tested, different reagents (e.g., probes, primers, etc.) may be chosen. That is, different reagents may be utilized for library preparation for a pathogen (e.g., bacteria, virus) or an organelle (e.g., mitochondria) than for a human genome. Pathogens exhibiting Ribonucleic Acid (RNA) genomes may have their genetic material translated to DNA before sequencing, enrichment, and/or library preparation are performed, via known techniques, such as Next Generation Sequencing (NGS) techniques.

Throughout the processes discussed above, the laboratory environment may be carefully controlled to ensure quality. For example, temperature within each segment of the laboratory may be carefully monitored and controlled, and ultraviolet lighting or other features capable of inactivating genetic material may be carefully positioned to ensure that contamination does not occur.

Bioinformatics

Sequencing data may be stored in any suitable format. In one embodiment, raw sequencing data generated during synthesis is stored in a file format such as Binary Base Call (BCL). This raw data may be fed to an analytical pipeline such as a cloud-based computing environment. Raw sequencing data may be processed by the pipeline into a second format, such as a text-based FASTQ format, that reports quality scores. The second format may then be analyzed to perform alignment of sequence reads to a reference genome, such as a reference genome reported in a Browser Extensible Data (BED) file. The aligned sequence data may be reported as a Binary Alignment Map (BAM) file or Compressed Reference-oriented Alignment Map (CRAM) file. The aligned sequence data may then be called, resulting in a Variant Call Format (VCF) file reporting called variants at each location of the genome that was sequenced, together with secondary metrics such as quality indicator metrics. As used herein, a variant comprises a unique combination of genetic information, in the form of consecutive base pairs at a specific set of locations (e.g., genomic coordinates) along a portion of a chromosome. Each variant is distinguished from other variants by having a different combination of base pairs along the set of locations. This may be due to Single Nucleotide Polymorphisms (SNPs) which relate to common single nucleotide changes, Single Nucleotide Variants (SNVs) which relate to rare nucleotide changes, insertions and/or deletions (Indels) which relate for example to the insertion or deletion of less than thirty base pairs, or differing numbers of repetitions, Copy Number Variants (CNVs), which relate to larger insertions or deletions, translocations, inversions, other types of genetic variants, or even combinations of variants, such as haplotypes or Multi-nucleotide variants (MNVs).

The called sequence data may be provided to a data analyst via a User Interface (UI), such as a Graphical User Interface (GUI) presented via a display. The technician may then validate the resulting variants called from the sequence data and release it for reporting to subjects, health care providers, and/or scientists.

Genomics Architecture

Figure 2:
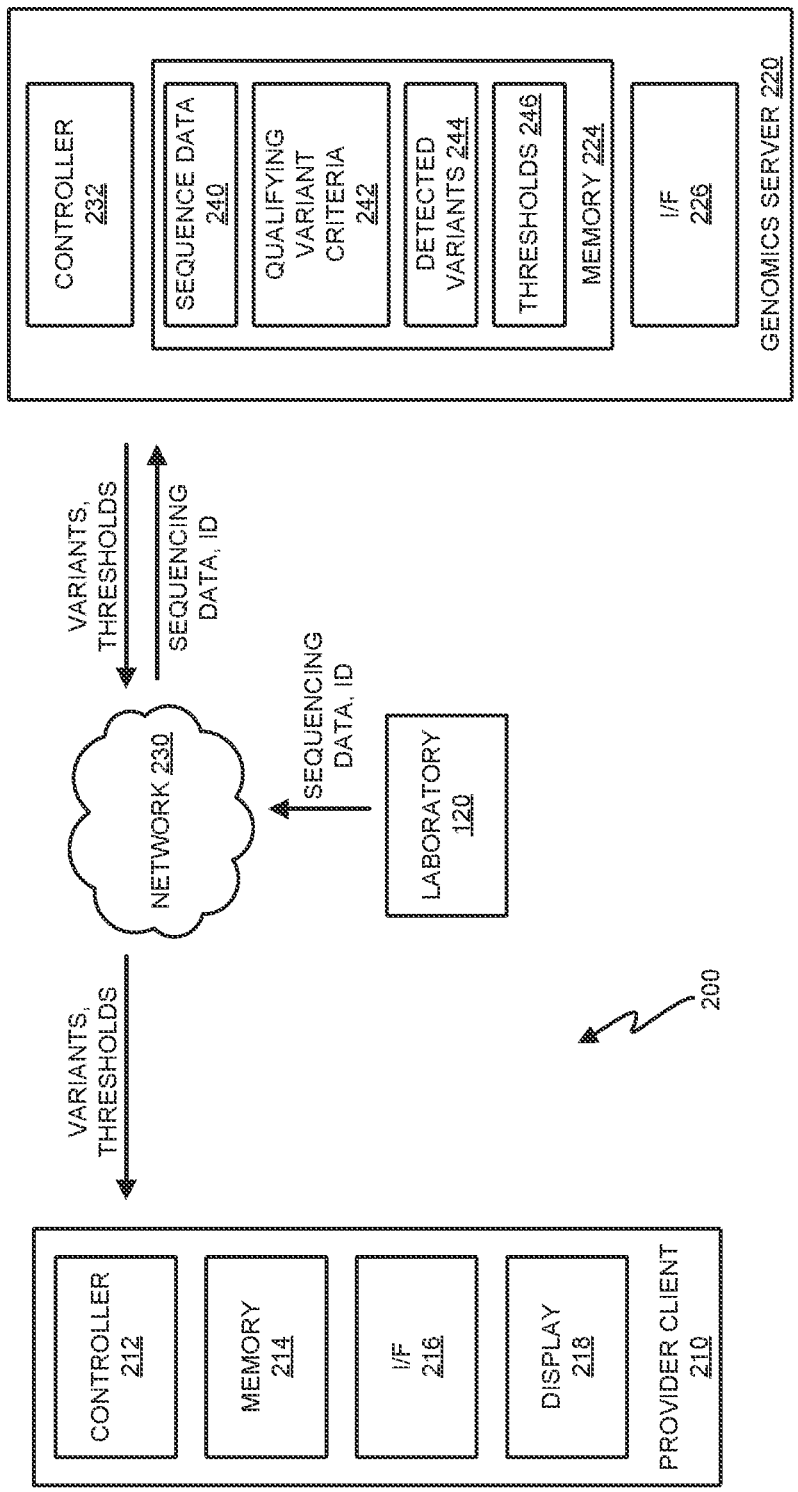
FIG. 2 is a block diagram illustrating a genomics architecture in an illustrative embodiment.

FIG. 2 is a block diagram illustrating a genomics architecture 200 in an illustrative embodiment. Genomics architecture 200 comprises any combination of systems and devices operable to review, process, and/or control access to sequencing data, including sequencing data received from genomics laboratory 120. In this embodiment, genomics architecture 200 comprises a genomics server 220 which receives sequencing data and identifiers (e.g., CSIs 108, LSIs, etc.) from genomics laboratory 120, via network 230.

Genomics server 220 receives the sequencing data via interface (I/F) 226, such as an Ethernet interface, wireless interface compliant with Institute of Electrical and Electronics Engineers (IEEE) 802.11 standards, or other physical interface capable of transmitting and receiving digital data. The sequencing data 240 is stored in memory 224 for the population of patients (e.g., millions of patients) that have been sequenced by laboratory 120, and may be maintained in any suitable format. Examples of such formats include CRAM, VCF, BAM, and others. Memory 224 may store, for example, sequence data 240 describing multiple patients, and this sequence data 240 may be maintained in a de-identified format to facilitate the advancement of research. Memory 224 may be implemented via a cloud storage service, or may comprise a storage medium such as a hard disk or flash memory device.

Memory 224 additionally stores qualifying variant criteria 242, detected variants 244, and thresholds 246 for diagnosis and/or treatment of various conditions associated with the variance 244. Examples include Centers for Disease Control (CDC) Tier 1 conditions, cardiomyopathy, pharmacogenomics sensitivities, BRCA1 and BRCA2 gene variants associated with breast cancer, GCK variants associated with type 2 diabetes, etc. In one embodiment, the portion of memory 224 storing these components is distinct from the portion of memory 224 storing sequence data 240.

Controller 232 manages the operations of genomics server 220, and may for example analyze sequence data 240 to identify detected variants 244, control access and authentication related to sequence data 240, communicate with one or more provider clients 210, and/or perform additional operations. Controller 232 may be implemented, for example, as custom circuitry, as a hardware processor executing programmed instructions, as a combination of shared hardware processing resources implementing a compute service, or some combination thereof.

Genomics architecture 200 further comprises provider client 210, which is configured to receive information regarding detected variants 244 and/or thresholds 246. In this embodiment, provider client 210 includes a controller 212, a memory 214, an interface (I/F) 216, and a display 218. Controller 212 manages the operations of the provider client 210, and may be implemented, for example, as custom circuitry, as a hardware processor executing programmed instructions, or some combination thereof. Memory 214 comprises information for interpreting the data received via I/F 216. Display 218 may comprise a projector, screen, etc. for presenting information to a user of provider client 210.

Interpreting Sequencing Data

After sequencing data for the patient has been acquired (e.g., as an accompaniment to blood testing, in a prior event that provided a sample 106, etc.), sequencing data for the genes is reviewed for that patient by controller 232 of genomics server 220. For example, the sequencing data may be reviewed across the entire genome or exome, including for one or more genes (e.g., GCK) that contribute to a specific phenotype or disease (e.g., type 2 diabetes).

With the foregoing description provided of illustrative systems for sample intake and sequencing, the following FIGS. recite illustrative methods for utilizing sequencing data (e.g., acquired using the systems of FIGS. 1-2) to facilitate diagnostic decisions.

Figure 3:
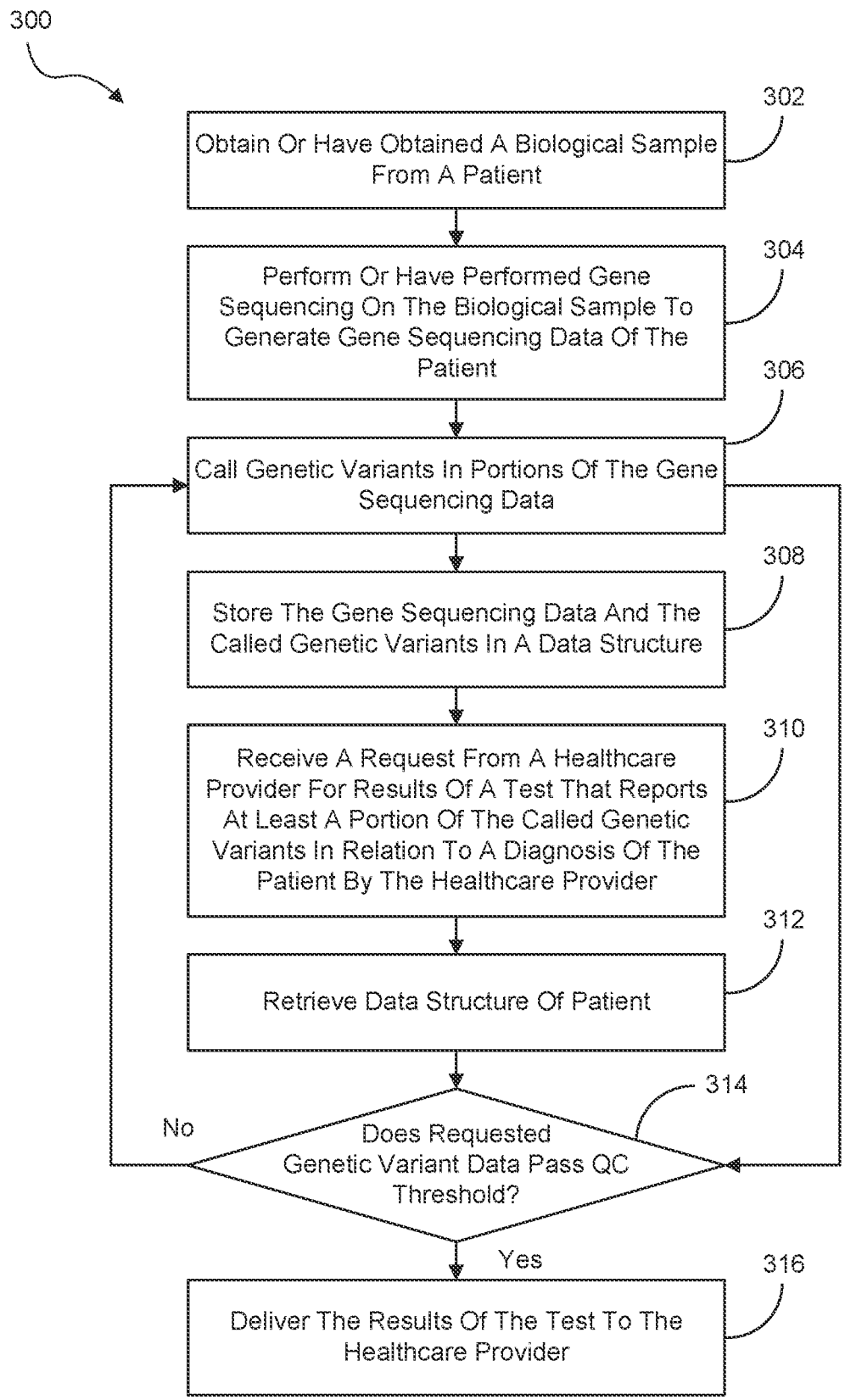
FIG. 3 is a flowchart of a method for processing a healthcare provider request for a genetic variant of a patient, in an illustrative embodiment.
Figure 4:
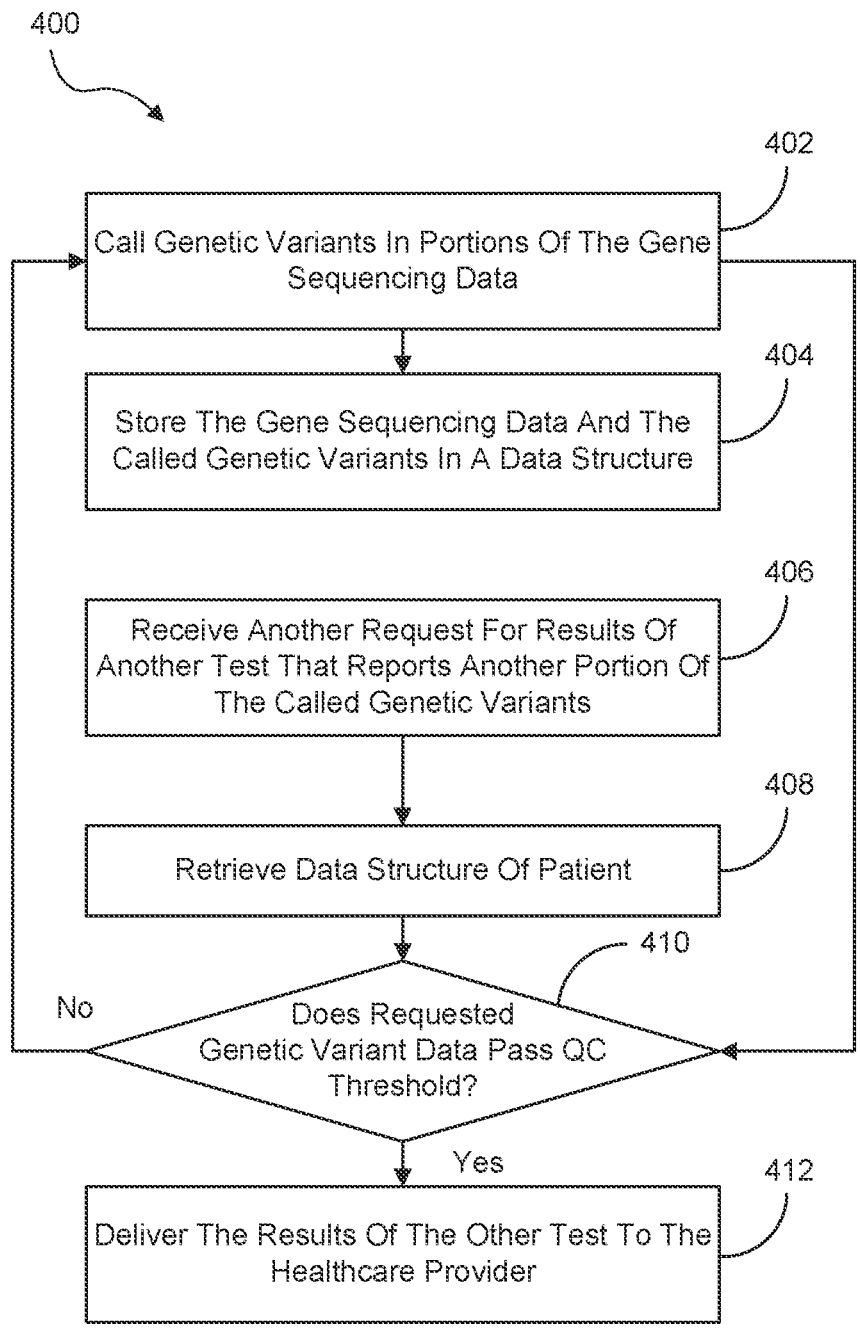
FIG. 4 is a flowchart of a method for processing another request from a healthcare provider for a genetic variant of the patient, in an illustrative embodiment.
Figure 5:
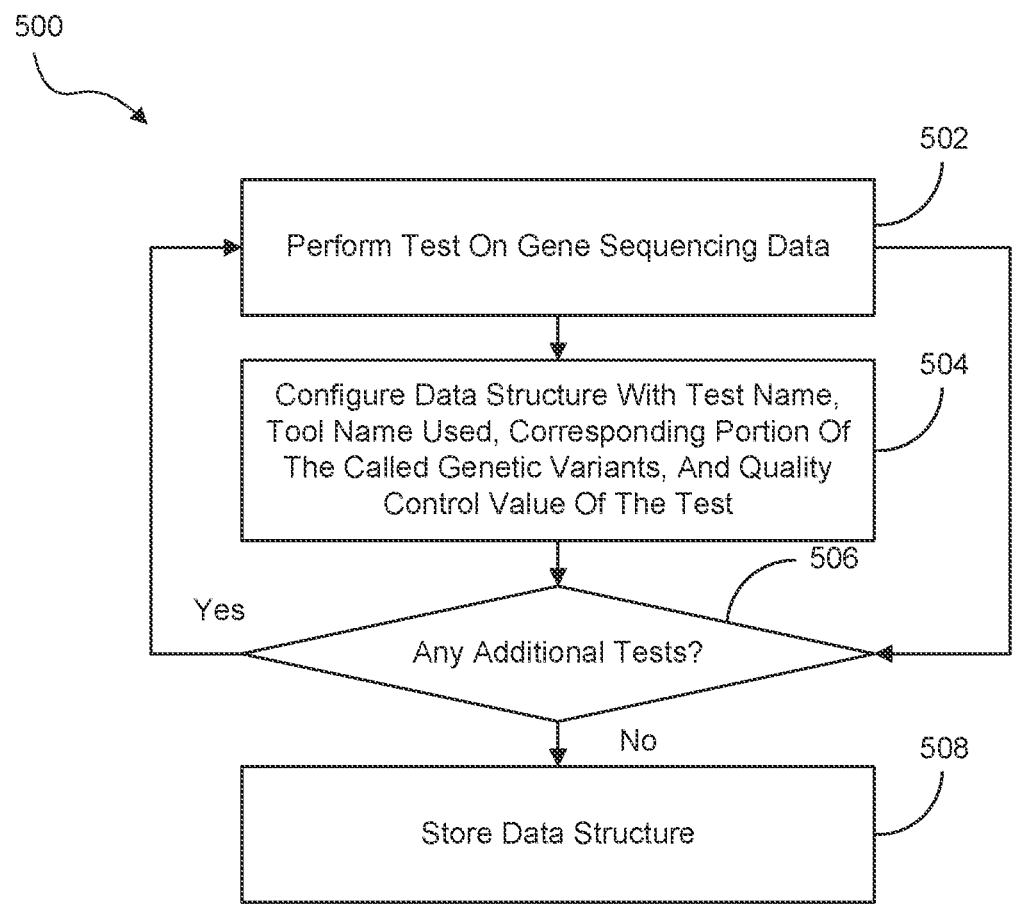
FIG. 5 is a flowchart of a method for configuring a data structure pertaining to the patient's gene sequencing, called variants, variant calling tools, and quality controls, in an illustrative embodiment.

FIGS. 3-5 are flowcharts for providing gene sequencing for a large swathe of genetic data for individual patients, and then providing for the reuse of that information one or more times for a healthcare provider to determine various genetic conditions for the patient.

As discussed above, a sample of genetic material for a patient may be received (e.g., from a health care provider) and sequenced (e.g., via an assay at a laboratory). Multiple analytical tools may be used to analyze the genomic data for the patient in order to determine results for one or more tests (e.g., diagnostic tests, population screening tests, etc.). As used herein, an analytical tool comprises a computer-implemented program, function, or code that analyzes genetic data to generate a quantitative or qualitative or result. As used herein, a diagnostic test comprises a request for genomic data that facilitates determination of a phenotype for a patient, either alone or in combination with supplemental data, such as data in an Electronic Health Record (EHR) for that patient. Results of a test may comprise a list of called variants at predetermined chromosomal locations, a classification of called variants (e.g., as benign or pathogenic), a specific diagnostic code within a medical vocabulary (e.g., International Classification of Diseases, Tenth Edition (ICD-10), Current Procedural Terminology (CPT)), etc.

The initial sequencing process performed at the laboratory may acquire a substantial amount of genetic data. This amount of genetic data does not need to correspond with the scope of an initial test that caused the sample to be sent to the laboratory. For example, even though the initial test may only consider a small portion of a gene, the laboratory may sequence the entire gene, the entire exome, the entire exome and selected additional regions, or the entire genome of the patient. The genetic data acquired during sequencing may be formatted in a FASTQ format.

Generally, the analytical tools used are software programs that perform bioinformatic operations, such as sequence alignment, variant calling, haplotype calling, and/or imputation for genetic data. Other analytical tools may be used for calling ancestry of the patient. One example of a tool that may be used includes a Burrows-Wheeler Aligner (BWA) process to map low-divergent sequences (e.g., in a FASTQ format generated by a sequencing machine) against a large reference genome, such as a human genome reported in a Binary Alignment Map (BAM) file. Another example of a tool that may be used includes the Genome Analysis Toolkit (GATK) from the Broad Institute in order to perform variant calling. To illustrate, the tool may receive a BAM file and perform variant calling using GATK or a derivative thereof, resulting in a Variant Call Format (VCF) file. In some scenarios, the analytical tools utilize pipelines implementing BWA and GATK processes, such as pipelines developed by Senticon, Inc. the analytical tools may be machine learning models that are re-trained or altered over time.

There are many types of genetic data that can be generated for the patient at the time of sequencing, and different tests require different subsets of this large range of data. For example, an initial test may consider only small variants and copy number variants across a set of genes, whereas a test ordered later may consider haplotypes (e.g., star alleles) for a different set of genes. In short, because the initial sequencing process covers a large range of data (e.g., the entire exome or full genome), a host of analytical tools that test for a variety of genetic conditions can be operated when the genetic data is first acquired. This includes analytical tools that test for conditions unrelated to the initial test that was requested for the patient.

The genetic data may then be stored with the results of the tests along with one or more Quality Control (QC) scores (e.g., numerical or binary results) that are determined based on a combination of a known accuracy of the analytical tool on a set of training data, the quality of underlying genomic data (e.g., a confidence of each variant call), and/or other metrics such as completeness of output or callability. Generally, callability is a percentage of targeted regions that have been successfully called (e.g., as opposed to being assigned a "NOCALL" by variant calling software). The QC for reporting Copy Number Variants (CNVs) may be determined by a statistical technique such as Goodness of Fit (GOF) applied to the data, as compared to GOF known for baseline data. In some instances, the QC score comprises a binary result, such as PASS or FAIL. This may be particularly beneficial for certain analytical tools (e.g., tools which check for MSH2 inversion). Numerical QC scores may be normalized to a predefined range, such as between 0 and 100, or between 0 and 1. For analytical tools with a binary output for QC, a value of one may correspond with a PASS and a value of zero may correspond with a FAIL.

In further embodiments, QC scores may indicate an amount of gene dispersion (e.g., a measurement of an amount that variance deviates from a mean value of read counts for a gene), a percentage of coverage uniformity for autosomes, or a callability of SNPs. For certain tests, callability or dispersion may be specific to an analytical tool designed to report results for that test. For example, callability may indicate a fraction of loci reviewed by the analytical tool that have more than a threshold amount of depth (e.g., ten reads, twenty reads, etc.), or coverage. In a further example, dispersion measured by the analytical tool may indicate median dispersion across loci read by the analytical tool, with dispersion calculated for read count covering each target across samples in a batch.

In some embodiments, QC scores describe metrics that may be used to determine a need for resequencing or acquiring a new sample for a patient. Examples include a ratio of human DNA to bacterial DNA, an amount of fold enrichment, a percentage of DNA corresponding with non-human animals or corresponding with yeast, a freemix score, or a percentage of on-bait capture.

A centralized module may associate a minimum quality score for each test. Different tests may have different minimum quality scores, even for the same portions of genomic data. Example minimum quality scores may be ninety-nine percent (or higher) for callability, 0.01 (or lower) for dispersion, five percent (or lower) for bacteria to human ratio, twenty (or higher) for fold enrichment, etc. As used herein, a minimum quality score refers to a lowest acceptable amount of quality, rather than a lowest numerical value. Thus, a minimum quality score may correspond with a lowest acceptable numerical value or highest acceptable numerical value, depending on the quality metric being considered, and whether or not lower numerical values indicate lower quality.

After the output of each analytical tool is provided and scored for quality, the module may selectively withhold test results that are below the minimum numerical quality for the corresponding test. Remaining test results that do achieve a desired level of quality may be immediately provided to the patient or a healthcare provider. Selectively withholding results on a test-by-test basis can enable a granularity in diagnostics that has been previously lacking. Selectively withholding the results can also enable the responsible segregation of pre-existing data into what can be released as a current diagnostic and what cannot. In other words, this technique enables existing data from an analytical tool to be selectively provided for diagnostics in a manner that ensures high-quality results are being used for diagnosis.

When the results from an analytical tool do not pass QC for reporting for a given test, the analytical tool may be re-run (e.g., using a newer version of the analytical tool than was originally used when sequencing was first performed). New results may then be released for a test if the QC requirements for that test have been achieved. In some embodiments, an analytical tool may be run on new data in order to meet the QC requirements. For example, a portion of the sample may be resequenced, according to a new version of a laboratory assay, to create new gene sequencing data that may be used as input for the analytical tool. This can enable test results to be available for rapid reporting to healthcare providers as soon as those test results are calculated with the desired level of accuracy for the underlying test. This may also protect against the risk of delivering earlier data that does not meet QC requirements.

The steps of the methods herein are described with reference to sample processing architecture 100 of FIG. 1 and genomics architecture 200 of FIG. 2, but those skilled in the art will appreciate that these methods may be performed in other systems. The steps of the flowcharts described herein are not all inclusive and may include other steps not shown. The steps described herein may also be performed in an alternative order.

With this in mind, FIG. 3 is a flowchart of a method 300 for processing a healthcare provider request for a genetic variant of a patient, in an illustrative embodiment. The genomics laboratory 120 may obtain or have obtained a biological sample 106 of a patient, in the process element 302. Then, that biological sample 106 may be sequenced. Thus, the gene sequencing equipment 160 may perform or have performed gene sequencing on the biological sample to generate gene sequencing data of the patient, in the process element 304. Instead of sequencing a portion of the biological sample as a result of a specific healthcare provider request, the gene sequencing equipment 160 may sequence a larger portion of the patient's genome, including all of the patient's genome.

Variant calling equipment (e.g., the genomics server 220) is operable to call genetic variants in portions of the gene sequencing data, in the process element 306. The gene sequencing data and the called genetic variants may be stored in a data structure in the memory 224, in the process element 308. Then, upon a healthcare provider request for a specific test, the genomics server 220 can access the data structure of the patient to retrieve the specific genetic variant(s) pertaining to the request. In this regard, an interface 226 is operable to receive a request from a healthcare provider for results of a test that reports at least a portion of the called genetic variants in relation to a diagnosis of the patient by the healthcare provider, in the process element 310.

Then, assuming that the request and/or the healthcare provider are valid, the controller 232 retrieves the data structure of the patient, in the process element 312. The controller 232 then determines whether a quality control value for the genomic data (e.g., for each called genetic variant, for the portion of genomic data as a whole, etc.) meets or exceeds a predetermined threshold of quality for assisting the healthcare provider. That is, the controller 232 determines whether the requested genetic variant data passes a quality control threshold (e.g., as specified by the healthcare provider and/or the specific test for the genetic variant), in the process element 314. The controller 232 delivers results of the test to the healthcare provider via the interface when the quality control value of said at least a portion of the called genetic variants meets or exceeds the predetermined threshold of quality, in the process element 316. If the quality control value does not pass the quality control threshold (i.e., the process element 314), the controller may direct the variant calling equipment to retest that portion of the gene sequencing data so as to call the genetic variants thereof using the same or different analytical tool (e.g., a new version of the analytical tool that was originally used) (i.e., the process element 306).

In one example, the predetermined threshold of quality for a first test requires a callability of ninety-five percent or higher. If the callability for sequencing data for a patient is ninety-eight percent, results may be immediately returned for the first test. If a predetermined threshold of quality for a second test requires a callability of ninety-nine percent or higher, then sequencing data for the patient may be re-analyzed with a newer version of the analytical tool, or the patient may be resequenced using DNA from the same sample or obtaining a new biological sample, before returning results for the second test.

Alternatively or additionally, the controller 232 may direct the genomics laboratory 120 to resequence a portion of the patient's biological sample for which the test of a specific genetic variant is sought. For example, the biological sample 106 may be preserved in the genomics laboratory 120. Then, if a healthcare provider makes a request for a specific genetic variant test in which the quality control threshold is not met, the controller 232 may generate a message to the genomics laboratory 120 that directs the genomics laboratory 120 to resequence that portion of the biological sample 106 such that the variant calling equipment can perform another variant call on the resequenced genetic data.

FIG. 4 is a flowchart of a method 400 for processing another request from a healthcare provider for a genetic variant of the patient, in an illustrative embodiment. In this embodiment, the interface 226 receives another request for results of another test that reports another portion of the called genetic variants, in the process element 406. Upon validation of the request, the controller 232 retrieves the data structure of the patient, in the process element 408, and determines whether the requested genetic variant data passes the quality control threshold, in the process element 410. If so, the controller 232 delivers the results of the other test to the requesting healthcare provider, in the process element 412. Otherwise, the controller 232 directs the variant calling equipment to retest the portion of the gene sequencing data, in the process element 402, for reevaluation, in the process element 410. The controller 232 may also store the gene sequencing data and the called genetic variants in the data structure, in the process element 404. For example, the controller 232 may overwrite the previous test results and/or add the newer test results to the data structure.

FIG. 5 is a flowchart of a method 500 for configuring a data structure pertaining to the patient's gene sequencing, called variants, variant calling tools, and quality controls, in an illustrative embodiment. In this embodiment, the genomics server 220 may perform a test for a particular genetic variant, in the process element 502. Once the test is complete, the controller 232 may configure the data structure with the test name (e.g., breast cancer genetic test, hypertrophic cardiomyopathy genetic test, breast and gynecological cancer genetic test, PKD1 genetic test etc.), the name and/or type of tool used to perform the test, the corresponding portion of the called genetic variants, and the quality control value of the test, in the process element 504. The controller 232 may then determine whether any additional tests should be performed, in the process element 506. If all testing has been performed, the controller 232 stores the data structure in the memory 224, in the process element 508. Otherwise, the controller 232 directs the performance of the next test on the gene sequencing data, in the process element 502.

Figure 6:
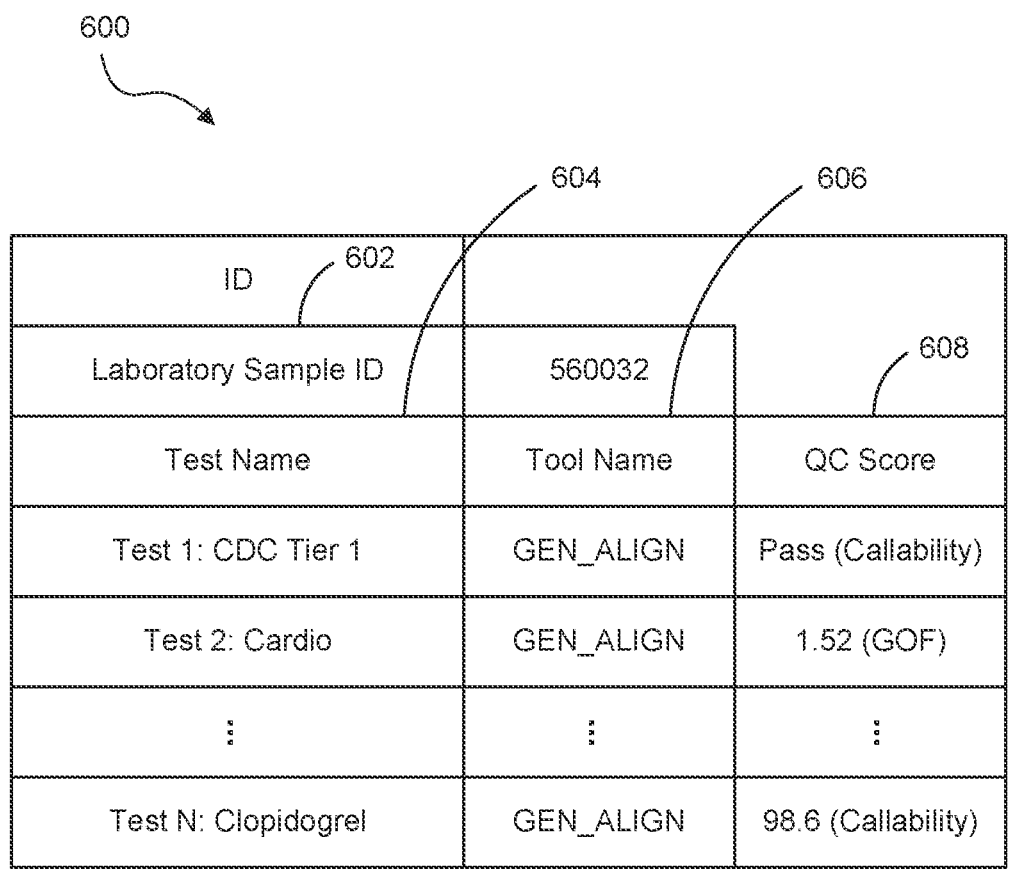
FIG. 6 is a block diagram of the data structure, in an illustrative embodiment.

FIG. 6 is an exemplary data structure 600 that may be used in the methods described herein. The data structure 600 includes a laboratory sample ID 602 (e.g., ID 560032) specific to a patient's biological sample and gene sequencing data. The data structure 600 also includes a test name section 604 of the various tests 1-N performed on the gene sequencing data (where the reference "N" is an integer greater than "1"). Alongside the test name section 604 is a tool name section 606 of the various tools that were performed on the tests 1-N as well as a quality control score 608 for each test performed.

While the exemplary embodiments herein are shown and described with respect to genetic variants being tested, these embodiments are not intended to be limited to such testing. One example of another test that could be performed includes ancestry analysis of the patient.

The embodiments herein provide notable improvements over prior techniques because they reduce or eliminate the need for physical re-testing for genetic purposes. This is a significant benefit because it avoids the added expense, delay, and risk of contamination and/or mislabeling risk that can be inherent in the retesting process. Version control operations provide an additional benefit by preserving processing resources while still enabling almost instantaneous diagnostic test reporting.

These embodiments also provide a notable benefit to healthcare providers that can rapidly identify any allergies or other adverse reactions that a patient may be genetically predisposed to based on their genetics. For example, when a healthcare provider considers writing a prescription, the healthcare provider can proactively identify and avoid medicines that may be adverse to the patient based on the patient's genetics. These embodiments are also useful to healthcare providers in diagnosing rare genetic conditions, because a misdiagnosis could have a tremendous impact on the life of a patient.

Any of the various computing and/or control elements shown in the figures or described herein may be implemented as hardware, as a processor implementing software or firmware, or some combination of these. For example, an element may be implemented as dedicated hardware. Dedicated hardware elements may be referred to as "processors," "controllers," or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

In one embodiment, instructions stored on a computer readable medium direct a computing system of any of the devices and/or servers discussed herein, such as genomics server 220, to perform the various operations disclosed herein. In some embodiments, all or portions of these operations may be implemented in a networked computing environment, such as a cloud computing system. Cloud computing often includes on-demand availability of computer system resources, such as data storage (cloud storage) and computing power, without direct active management by a user. Cloud computing relies on the sharing of resources, and generally includes on-demand self-service, broad network access, resource pooling, rapid elasticity, and measured service.

Figure 7:
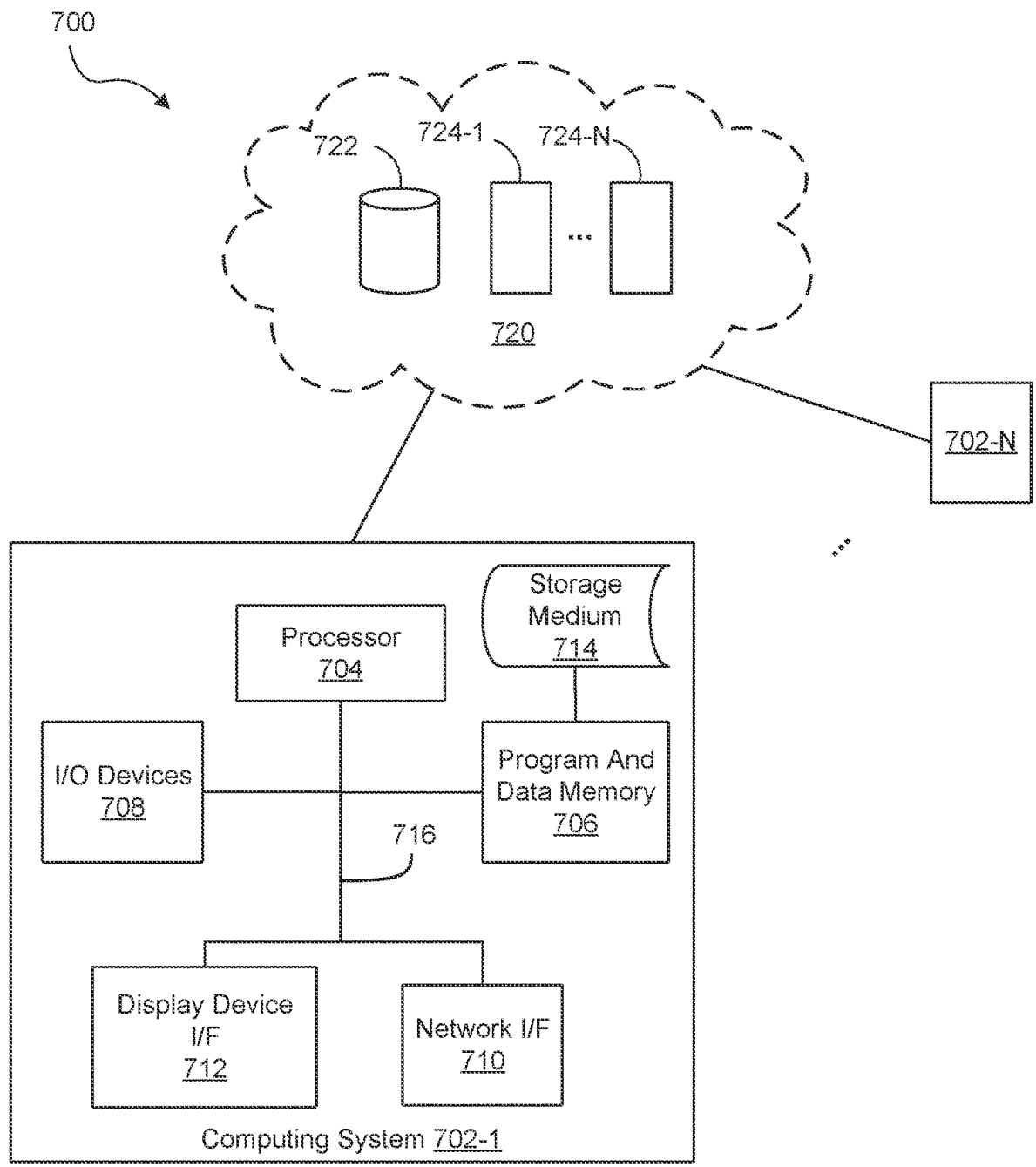
FIG. 7 depicts an illustrative cloud computing system operable to execute programmed instructions embodied on a computer readable medium.

FIG. 7 depicts one illustrative cloud computing system 700 operable to perform the above operations by executing programmed instructions tangibly embodied on one or more computer readable storage mediums. The cloud computing system 700 generally includes the use of a network of remote servers hosted on the internet to store, manage, and process data, rather than a local server or a personal computer (e.g., in the computing systems 702-1-702-N). Cloud computing enables users to use infrastructure and applications via the internet, without installing and maintaining them on-premises. In this regard, the cloud computing network 720 may include virtualized information technology (IT) infrastructure (e.g., servers 724-1-724-N, the data storage module 722, operating system software, networking, and other infrastructure) that is abstracted so that the infrastructure can be pooled and/or divided irrespective of physical hardware boundaries. In some embodiments, the cloud computing network 720 can provide users with services in the form of building blocks that can be used to create and deploy various types of applications in the cloud on a metered basis.

Various components of the cloud computing system 700 may be operable to implement the above operations in their entirety or contribute to the operations in part. For example, a computing system 702-1 may be used to perform analysis of gene sequencing data, and then store that analysis along with the gene sequencing data in a data storage module 722 (e.g., a database) of a cloud computing network 720. Various computer servers 724-1-724-N of the cloud computing network 720 may be used to operate on the gene sequencing data and/or transfer the gene sequencing analysis and/or the gene sequencing data to another computing system 702-N.

Some embodiments disclosed herein may utilize instructions (e.g., code/software) accessible via a computer-readable storage medium for use by various components in the cloud computing system 700 to implement all or parts of the various operations disclosed hereinabove. Examples of such components include the computing systems 702-1-702-N.

Exemplary components of the computing systems 702-1-702-N may include at least one processor 704, a computer readable storage medium 714, program and data memory 706, input/output (I/O) devices 708, a display device interface 712, and a network interface 710. For the purposes of this description, the computer readable storage medium 714 comprises any physical media that is capable of storing a program for use by the computing system 702. For example, the computer-readable storage medium 714 may be an electronic, magnetic, optical, electromagnetic, infrared, semiconductor device, or other non-transitory medium. Examples of the computer-readable storage medium 714 include a solid-state memory, a magnetic tape, a removable computer diskette, a random access memory (RAM), a read-only memory (ROM), a rigid magnetic disk, and an optical disk. Some examples of optical disks include Compact Disk-Read Only Memory (CD-ROM), Compact Disk-Read/Write (CD-R/W), Digital Versatile Disc (DVD), and Blu-Ray Disc.

The processor 704 is coupled to the program and data memory 706 through a system bus 716. The program and data memory 706 include local memory employed during actual execution of the program code, bulk storage, and/or cache memories that provide temporary storage of at least some program code and/or data in order to reduce the number of times the code and/or data are retrieved from bulk storage (e.g., a hard disk drive, a solid state drive, or the like) during execution.

Input/output or I/O devices 708 (including but not limited to keyboards, displays, touchscreens, microphones, pointing devices, etc.) may be coupled either directly or through intervening I/O controllers. Network adapter interfaces 710 may also be integrated with the system to enable the computing system 702 to become coupled to other computing systems or storage devices through intervening private or public networks. The network adapter interfaces 710 may be implemented as modems, cable modems, Small Computer System Interface (SCSI) devices, Fibre Channel devices, Ethernet cards, wireless adapters, etc. Display device interface 712 may be integrated with the system to interface to one or more display devices, such as screens for presentation of data generated by the processor 704.

What is claimed is:

1. A method, comprising:
obtaining or having obtained a biological sample from a patient;
performing or having performed sequencing on the biological sample to generate gene sequencing data of the patient;
calling genetic variants in portions of the gene sequencing data;
storing the gene sequencing data and the called genetic variants in a data structure;
receiving a request from a healthcare provider to have genetic testing performed on the patient to obtain results of a test that reports at least a portion of the called genetic variants in relation to a diagnosis or test of the patient by the healthcare provider, said diagnosis or test of the patient by the healthcare provider being performed after said obtaining, performing, calling, and storing;
accessing a quality control value of said at least a portion of the called genetic variants in response to the request without performing additional sequencing;
delivering said at least a portion of the called genetic variants to the healthcare provider if said quality control value of said at least a portion of the called genetic variants meets or exceeds a predetermined threshold of quality for assisting the healthcare provider;
receiving another request to have genetic testing performed on the patient to obtain results of another test that reports another portion of the called genetic variants;
accessing a quality control value of said another portion of the called genetic variants in response to said another request without performing additional sequencing; and
delivering said another portion of the called genetic variants if said quality control value of said another portion of the called genetic variants meets or exceeds a predetermined threshold for assisting the healthcare provider.

2. The method of claim 1, further comprising:
assigning an identifier to the gene sequencing data that identifies the patient; and
labeling the data structure with the assigned identifier.

3. The method of claim 1, wherein:
calling the genetic variants further comprises determining quality control values for the called genetic variants.

4. The method of claim 1, wherein:
the quality control value is at least one of: a callability of at least ninety-nine percent across genetic loci considered by the test; at most 0.01 for a gene dispersion of the gene sequencing data associated with the called genetic variant; at most five percent for a ratio of bacterial DNA to human DNA of the gene sequencing data associated with the called genetic variant; at least twenty for fold enrichment of the gene sequencing data associated with the called genetic variant.

5. The method of claim 1, further comprising:
preserving the biological sample in a laboratory; and
retesting the biological sample when the quality control value of said at least a portion of the called genetic variants does not meet the predetermined threshold, wherein retesting comprises resequencing a portion of the biological sample at locations of said at least a portion of the called genetic variants in the gene sequencing data.

6. The method of claim 1, further comprising:
performing a plurality of tests on the gene sequencing data; and
for each of the plurality of tests, configuring the data structure to store a test name of the test, a tool name used to perform the test, a corresponding portion of the called genetic variants, and a quality control value of the test.

7. A non-transitory computer readable medium embodying programmed instructions which, when executed by a processor, are operable for performing a method comprising:
obtaining or having obtained a biological sample from a patient;
performing or having performed sequencing on the biological sample to generate gene sequencing data of the patient;
calling genetic variants in portions of the gene sequencing data;
storing the gene sequencing data and the called genetic variants in a data structure;
receiving a request from a healthcare provider to have genetic testing performed on the patient to obtain results of a test that reports at least a portion of the called genetic variants in relation to a diagnosis or test of the patient by the healthcare provider, said diagnosis or test of the patient by the healthcare provider being performed after said obtaining, performing, calling, and storing;

accessing a quality control value of said at least a portion of the called genetic variants in response to the request without performing additional sequencing;
delivering said at least a portion of the called genetic variants to the healthcare provider if said quality control value of said at least a portion of the called genetic variants meets or exceeds a predetermined threshold of quality for assisting the healthcare provider;
receiving another request to have genetic testing performed on the patient to obtain results of another test that reports another portion of the called genetic variants;
accessing a quality control value of said another portion of the called genetic variants in response to said another request without performing additional sequencing; and
delivering said another portion of the called genetic variants if said quality control value of said another portion of the called genetic variants meets or exceeds a predetermined threshold for assisting the healthcare provider.

8. The computer readable medium of claim 7, further comprising instructions which, when executed by the processor, are operable for:
assigning an identifier to the gene sequencing data that identifies the patient; and
labeling the data structure with the assigned identifier.

9. The computer readable medium of claim 7, further comprising instructions which, when executed by the processor, are operable for:
determining quality control values for the called genetic variants.

10. The computer readable medium of claim 7, wherein:
the quality control value is at least one of: a callability of at least ninety-nine percent across genetic loci considered by the test; at most 0.01 for a gene dispersion of the gene sequencing data associated with the called genetic variant; at most five percent for a ratio of bacterial DNA to human DNA of the gene sequencing data associated with the called genetic variant; at least twenty for fold enrichment of the gene sequencing data associated with the called genetic variant.

11. The computer readable medium of claim 7, further comprising instructions which, when executed by the processor, are operable for:
preserving the biological sample in a laboratory; and
retesting the biological sample when the quality control value of said at least a portion of the called genetic variants does not meet the predetermined threshold, wherein retesting comprises resequencing a portion of the biological sample at locations of said at least a portion of the called genetic variants in the gene sequencing data.

12. The computer readable medium of claim 7, further comprising instructions which, when executed by the processor, are operable for:
performing a plurality of tests on the gene sequencing data; and
for each of the plurality of tests, configuring the data structure to store a test name of the test, a tool name used to perform the test, a corresponding portion of the called genetic variants, and a quality control value of the test.

13. A system, comprising:
gene sequencing equipment operable to perform or have performed sequencing on a biological sample obtained from a patient to generate gene sequencing data of the patient;
variant calling equipment operable to call genetic variants in portions of the gene sequencing data;
a storage device operable to store the gene sequencing data and the called genetic variants in a data structure;
an interface operable to receive a request from a healthcare provider to have genetic testing performed on the patient to obtain results of a test that reports at least a portion of the called genetic variants in relation to a diagnosis or test of the patient by the healthcare provider, said diagnosis or test of the patient by the healthcare provider being performed after said sequencing, genetic variant calls, and storage of the gene sequencing data and the called genetic variants; and
a controller operable to determine whether a quality control value of said at least a portion of the called genetic variants meets or exceeds a predetermined threshold of quality for assisting the healthcare provider in response to the request without performing additional sequencing, and to deliver said at least a portion of the called genetic variants to the healthcare provider via the interface when the quality control value of said at least a portion of the called genetic variants meets or exceeds the predetermined threshold of quality, wherein:
the interface is further operable to receive another request to have genetic testing performed on the patient to obtain results of another test that reports another portion of the called genetic variants; and
the controller is further operable to access a quality control value of said another portion of the called genetic variants in response to said another request without performing additional sequencing, and to deliver said another portion of the called genetic variants via the interface if said quality control value of said another portion of the called genetic variants meets or exceeds a predetermined threshold for assisting the healthcare provider.

14. The system of claim 13, wherein:
the controller is further operable to assign an identifier to the gene sequencing data that identifies the patient, and to label the data structure with the assigned identifier.

15. The system of claim 13, wherein:
the controller is further operable to determine quality control values for the called genetic variants.

16. The system of claim 13, wherein:
the quality control value is at least one of: a callability of at least ninety-nine percent across genetic loci considered by the test; at most 0.01 for a gene dispersion of the gene sequencing data associated with the called genetic variant; at most five percent for a ratio of bacterial DNA to human DNA of the gene sequencing data associated with the called genetic variant; at least twenty for fold enrichment of the gene sequencing data associated with the called genetic variant.

17. The system of claim 13, wherein:
the gene sequencing equipment is further operable to retest the biological sample when the quality control value of said at least a portion of the called genetic variants does not meet the predetermined threshold by resequencing a portion of the biological sample at locations of said at least a portion of the called genetic variants in the gene sequencing data.

18. The system of claim 13, wherein:
the variant calling equipment is further operable to perform a plurality of tests on the gene sequencing data; and the controller, for each of the plurality of tests, is further operable to configure the data structure to store a test name of the test, a tool name used to perform the test, a corresponding portion of the called genetic variants, and a quality control value of the test.

* * * * *